(12) United States Patent
Kolbe et al.

(10) Patent No.: US 10,483,746 B2
(45) Date of Patent: Nov. 19, 2019

(54) COVER AND PROCESS TO COVER A SECTION OF AT LEAST ONE ELECTRICAL CONDUCTOR

(71) Applicant: GE Energy Power Conversion Technology Ltd, Rugby, Warwickshire (GB)

(72) Inventors: Thomas Kolbe, Berlin (DE); Martin Bansemir, Berlin (DE); Jan Kamm, Berlin (DE)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 0 days.

(21) Appl. No.: 15/779,997

(22) PCT Filed: Nov. 28, 2016

(86) PCT No.: PCT/EP2016/078941
§ 371 (c)(1),
(2) Date: May 30, 2018

(87) PCT Pub. No.: WO2017/093159
PCT Pub. Date: Jun. 8, 2017

(65) Prior Publication Data
US 2018/0351340 A1    Dec. 6, 2018

(30) Foreign Application Priority Data
Nov. 30, 2015    (EP) .................................... 15196946

(51) Int. Cl.
*H02G 15/115*    (2006.01)
*H01R 4/70*    (2006.01)
(Continued)

(52) U.S. Cl.
CPC ............. *H02G 15/115* (2013.01); *H01R 4/22* (2013.01); *H01R 4/60* (2013.01); *H01R 4/70* (2013.01); *H02G 5/02* (2013.01); *H02G 15/117* (2013.01)

(58) Field of Classification Search
CPC ...... H02G 15/115; H02G 5/02; H02G 15/117; H01R 4/22; H01R 4/60; H01R 4/70
(Continued)

(56) References Cited

U.S. PATENT DOCUMENTS 3,260,983 A  *  7/1966  Daum .................. H01B 17/306
                                                                174/138 F
4,345,332 A      8/1982  Wronka
(Continued)

FOREIGN PATENT DOCUMENTS

| EP | 1 936 751 A1 | 6/2008 |
| EP | 2602891 A2 * | 6/2013 |
| JP | H6-13335 U | 2/1994 |

OTHER PUBLICATIONS

Extended European Search Report and Opinion issued in connection with corresponding EP Application No. 15196946.6 dated May 11, 2016.
(Continued)

*Primary Examiner* — Timothy J Thompson
*Assistant Examiner* — Charles Pizzuoto
(74) *Attorney, Agent, or Firm* — Wood IP LLC

(57) ABSTRACT

The invention relates to a cover to enclose a longitudinal section of at least one electrical conductor and prevent the formation of an arc or a flashover. The cover has at least two cover parts made of an electrically insulating material. A first cover part and a second cover part each have at least one passage opening. Each passage opening has an electrical conductor guided through it, so that no gap opening, or only (Continued)

a small gap opening remains between the outside surface of the conductor and a bordering wall of the passage opening. Moreover, the cover has at least one connection location. At this connection location, two of the cover parts that are present lie against one another in a force-fit and/or positive-fit manner and form a nondestructively detachable connection. This ensures accessibility to the protected longitudinal section.

12 Claims, 4 Drawing Sheets

(51) Int. Cl.
    *H02G 5/02*     (2006.01)
    *H02G 15/117*     (2006.01)
    *H01R 4/22*     (2006.01)
    *H01R 4/60*     (2006.01)

(58) Field of Classification Search
    USPC ........................................................ 174/114 R
    See application file for complete search history.

(56) References Cited

U.S. PATENT DOCUMENTS

| | | | |
|---|---|---|---|
| 6,198,063 | B1 | 3/2001 | Kramer |
| 6,765,169 | B2 | 7/2004 | Kruschke |
| 9,765,893 | B2 * | 9/2017 | Hosen ..................... F16J 3/042 |

OTHER PUBLICATIONS

International Search Report and Written Opinion issued in connection with corresponding PCT Application No. PCT/EP2016/078941 dated Mar. 17, 2017.

* cited by examiner

COVER AND PROCESS TO COVER A SECTION OF AT LEAST ONE ELECTRICAL CONDUCTOR

BACKGROUND TO THE INVENTION

The invention relates to a cover and a process to cover at least one section of an electrical conductor. The cover can be used, for example, to cover a connection location between two conductor ends at which the conductors are not electrically insulated. In particular, the cover is designed to avoid arcing, which could come from the covered section of the at least one electrical conductor, or which could lead to this section.

BRIEF DESCRIPTION OF THE INVENTION

Many variants of housings and covers for electrical conductors are known. For example, U.S. Pat. No. 6,765,169 B2 describes an arc quenching chamber for low-voltage switchgear. The arc quenching chamber is in the form of a housing. The arc quenching chamber is closed by a cover at an opening. The cover can be fixed to the housing without the use of screws by means of guide and latching elements which can be pushed one inside the other. This is intended to create a connection between the cover and the housing that prevents the escape of ionized switching gases, and thus electrical flashovers.

The goal of this invention is to protect an electrically uninsulated point of at least one conductor, for example a connection location between two or more conductor ends, against arcing, and to do so in a simple manner.

The inventive cover is designed to enclose a section of at least one electrical conductor and, in particular a connection location between two or more conductor ends, and thus to protect against arcing to other conducting components in the environment. For this purpose, the cover has at least two cover parts made of an electrically insulating material. Preferably, the cover consists of two or three separate cover parts.

A first cover part has at least one passage opening. The passage opening is set up to guide an electrical conductor through the first cover part. There is a second cover part that also has at least one passage opening, each of which is designed to guide an electrical conductor that is present. Between the first and the second cover part, in a longitudinal section that can be covered by the cover, each of the conductors that is guided through can be electrically connected with one another. Every passage opening has a bordering wall closed in the shape of a ring. Between the bordering wall and the outside surface of each of the electrical conductors that is guided through, no gap opening remains, or only a gap opening with small dimension measured at right angles to the bordering wall remains. The remaining gap opening is at least no larger than a specified maximum cross section profile. The cross section profile is preferably predefined and corresponds to an ignition wire with a specified cross section. The remaining gap opening is sufficiently small that the ignition wire that is prescribed for a standardized test cannot be guided through the remaining gap opening, and consequently between the outside surface of the electrical conductor that is guided through and the border.

The cover has at least one, and in a preferred sample embodiment, two connection locations. On at least one of the connection locations that are present, two adjacent cover parts can be detachably connected with one another. The connection can be nondestructively undone and reconnected. Preferably, the connection can be undone without a tool and made without a tool. To produce the connection, no separate connection elements such as screws, bolts, rivets, cable ties, pipe clamps or things of that kind are required or present. The two cover parts fastened together at the respective connection location are directly connected together in a force-fit and/or positive-fit manner. The cover parts are preferably connected at every connection location without a gap.

When the connection has been made, the cover completely encloses an electrically uninsulated area of the at least one conductor, for example the connection location between multiple conductors. The longitudinal section of the at least one conductor, which the cover protects from the environment, is located between the first cover part and the second cover part. Thus, the cover can avoid the formation of an arc or sufficiently quickly quench an arc that arises.

It is advantageous for at least one of the cover parts that are present to be elastically deformable at least on the part associated with the at least one connection location. Preferably, the elastic deformation of at least one of the cover parts at the connection location produces the elastic pretensioning force with which the two cover parts lie against one another at the connection location.

Furthermore, it is preferable if two of the cover parts are directly connected with one another at each of the connection locations that are present. No other connection means or elements are interposed.

In a preferred embodiment, the one of the two cover parts at a connection location has a ring-shaped connection groove. The respective other cover part has a ring-shaped connection projection. The ring-shaped connection projection is designed to engage into the connection groove of the respective other cover part when the two cover parts are connected at the connection location. This also produces a positive-fit connection in addition to a force-fit connection. The connection groove is preferably open away from the periphery of the cover part toward the outside. Accordingly, the connection projection of the respective other cover part projects inward from a peripheral edge. The ring-shaped connection groove and/or the ring-shaped connection projection can have a circular, elliptical, rectangular, polygonal, or any other cross sectional shape. Preferably, the cross sectional shape has no corners, but rather is rounded. This makes it simpler to make a gap-free connection.

It is also advantageous for at least one of the two cover parts connected with one another at a connection location to be elastically deformable to make and undo the connection. Thus, to make or undo the connection, one of the two cover parts is deformed, for example expanded, so that it can be put onto or removed from one section of the respective other cover part.

It is also advantageous if at least one of the two cover parts is elastically deformed when the connection is made between the two cover parts, causing it to exert an elastic pretensioning force or contact pressure onto the respective other cover part. Thus, additional means are not required to produce the non-positive connection.

It is especially advantageous if an elastic pretensioning force or contact pressure between the two cover parts at a connection location acts on the connection location in a peripheral direction around the longitudinal section, preferably uniformly over the entire periphery. For example, a cover part and preferably the connection projection can be expanded when the connection is made, and press in the peripheral direction at every peripheral point against the other cover part, and preferably the associated connection groove.

In one embodiment, it is possible for the first cover part and the second cover part to be moveable relative to one another along the at least one conductor, at least when the connection is undone at the at least one connection location. For example, moving the two cover parts away from one another can allow access to the covered longitudinal section of the at least one conductor.

In one embodiment of the cover, it can be sufficient for two cover parts, namely the first cover part and the second cover part, to be present. For example, hollow cylindrical sections of these two cover parts can, when the connection is made at the connection location, overlap in the longitudinal direction, approximately parallel to the coverable longitudinal section of the at least one conductor, and lie against one another in a positive-fit and/or force-fit manner.

In a preferred sample embodiment, the first cover part and the second cover part, which have the passage openings, are arranged at a distance from one another. The first cover part and the second cover part have no direct contact with one another.

It can be advantageous for the cover to have a third cover part. The third cover part can, for example, cover the area between the first cover part and the second cover part. The third cover part is preferably connected with the first cover part at a first connection location and with the second cover part at a second connection location. At least one of these two connection locations is designed so that it is detachable. The other connection location can also be made to be detachable or alternatively non-detachable, for example materially bonded by an adhesive.

The third cover part can be tubular, for example. It can be collapsible in a longitudinal direction in which it extends between the first cover part and the second cover part, and be in the form of a type of expansion bellows, for example. The expansion bellows shape can give the third cover part a certain intrinsic stiffness radial to the longitudinal direction, and enclose in the form of a tube or pipe the longitudinal section to be covered of the at least one conductor. When the connection at a connection location is undone, the third cover part can be pushed together in the longitudinal direction.

It is advantageous for the third cover part to be elastically deformable, at least radial to the longitudinal direction. In this embodiment, it is preferable for the first cover part and/or the second cover part to be in the form of rigid bodies. The first cover part and/or the second cover part can be, for example, in the form of plates, which are oriented approximately at right angles to the longitudinal direction.

In one embodiment, the third cover part has an annular ring on at least one of its two ends, which are opposite one another in the longitudinal direction. This annular ring can form, for example, the connection projection, to allow, at the connection location, a positive-fit connection to be made with a connection groove on the respective other cover part. The annular ring can be made as an integral part of the third cover part, without a seam or joint.

Preferably, each cover part that is present is made as an integral part out of a uniform material, without a seam or joint. Therefore, in one embodiment the cover consists of two or a maximum of three components. All cover parts are insulating with respect to the electrical voltages or currents that are present, and can be made, for example, of a plastic, such as, for instance, silicone or ethylene propylene diene monomer rubber (EPDM). The cover parts can also consist of different materials, for example the third cover part can be made of a different material than the first cover part and/or the second cover part.

The cover is used as follows to cover a section of at least one electrical conductor:

First, at least one first conductor is guided through each passage opening of the first cover part. In a corresponding way, at least one second conductor is guided through each passage opening of the second cover part. The area between the first and the second cover parts should be covered to avoid arcing. The at least one first conductor and the at least one second conductor are electrically connected with one another in the area between the first cover part and the second cover part. Then, the cover on the at least one connection location is closed by making the detachable force-fit and/or positive-fit connection. This can be done, for example, by pushing the first cover part and the second cover part relative to one another in the axial direction.

In another sample embodiment, a third cover part can be present. If a third cover part is present, then it is preferably connected with the first cover part or the second cover part before the electrical connection is made. Preferably, it is then handled together with the first or second cover part in question, so that the third cover part already encloses the at least one conductor in the peripheral direction after the conductor in question has been guided through the at least one passage opening of the first or second cover part. After the electrical connection has been made, the third cover part can then be connected with the first or second cover part that is not yet connected.

BRIEF DESCRIPTION OF THE DRAWINGS

Advantageous embodiments of the invention follow from the dependent claims, the description, and the drawings. Sample embodiments of the invention are explained in detail below using the attached drawings. The figures are as follows:

DETAILED DESCRIPTION OF THE INVENTION

Figure 1:
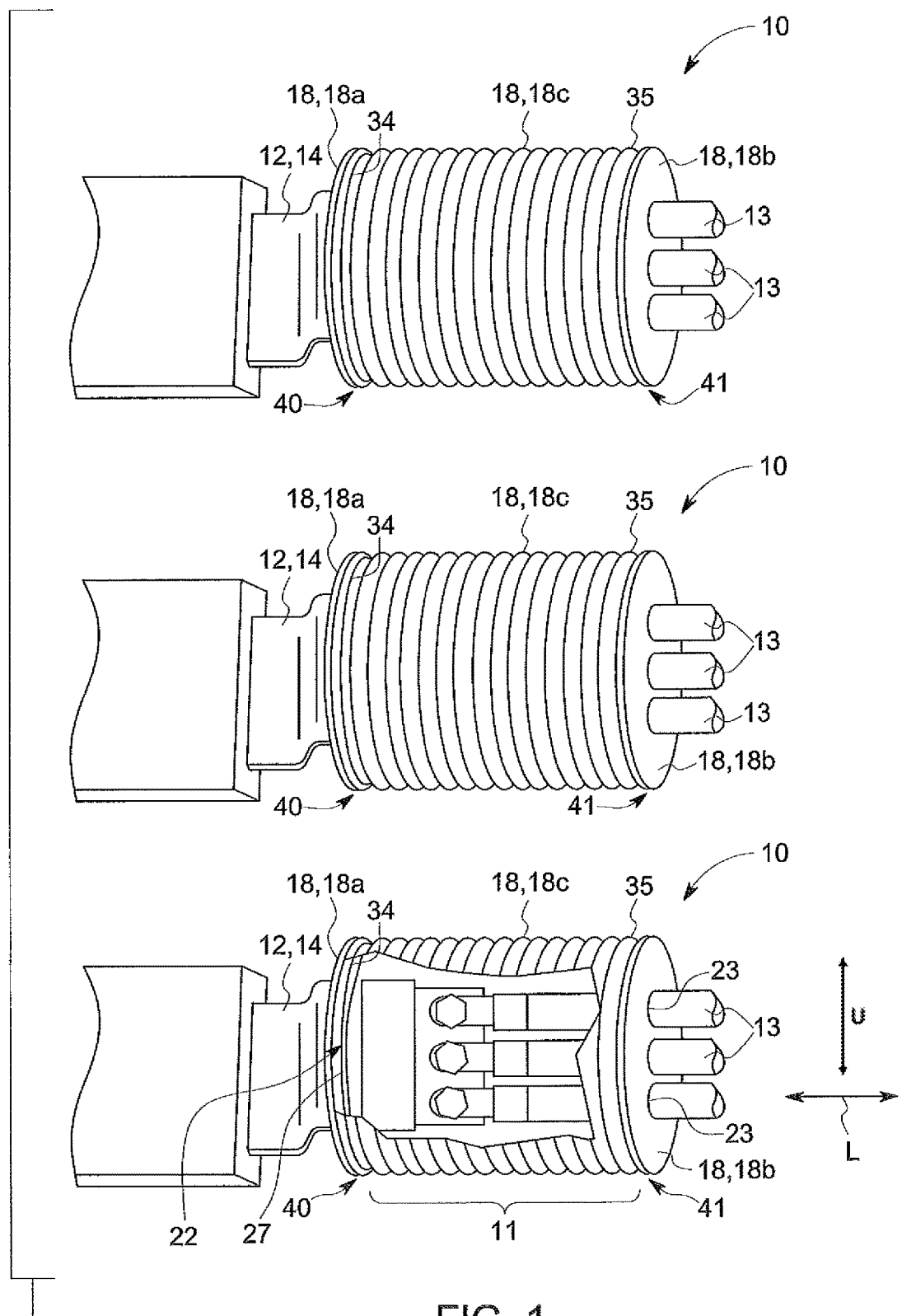
FIG. 1 is a schematic perspective and partly cutaway representation of a sample embodiment of a cover.

FIG. 1 illustrates a sample embodiment of a cover 10 for a longitudinal section 11 of at least one electrical conductor 12, 13. In the sample embodiment, at least one electrical first conductor 12 and at least one electrical second conductor 13 are present to conduct an electric current. In the area of the longitudinal section 11, the at least one first conductor 12 is electrically connected with the at least one second conductor 13. In the sample embodiment shown, the conductors 12, 13 are screwed together in an electrically conductive manner in the area of the longitudinal section 11. The electrically conductive connection between the at least one first conductor 12 and the at least one second conductor 13 can be made in any known manner.

The electrical conductors 12, 13 can be an electrically conductive current bus, for example a busbar, a wire, an electrical cable, etc.

The longitudinal section 11 of the conductors 12, 13 that is covered by cover 10 extends in a longitudinal direction L, as is schematically shown in FIG. 1.

In the sample embodiment described here, both the first conductor 12 and the second conductor 13 have an electrically insulating sheath outside of the longitudinal section 11 that is covered or coverable by the cover 10. In the area of the electrical connection, the at least one first conductor 12 and the at least one second conductor 13 are not insulated, in order to allow the electrical connection to be made between the conductors 12, 13. The cover 10 is designed to avoid the formation of an arc between one of the electrically uninsulated parts inside the longitudinal section 11 and an adjacent electrically conductive component. For example, multiple conductors 12, 13 or connection locations of different electrical potentials can be arranged next to one another, as is schematically shown in FIG. 1. Each of the first conductors 12 shown can represent a connection 14 of a polyphase transformer. Each connection 14 has at least one second conductor 13 electrically connected to it. The use of the covers 10 prevents arcing between the adjacent conductors 12, 13 or connections 14.

The cover 10 is made in several parts and consists of two or more cover parts 18. In the sample embodiment according to FIGS. 1 through 7, the cover 10 has a first cover part 18*a*, a second cover part 18*b*, and a third cover part 18*c*. Preferably, the cover 10 consists only of two or more cover parts 18. Additional components can be dropped. Accordingly, the cover 10 according to the first sample embodiment of FIGS. 1 through 7 consists only of the first cover part 18*a*, the second cover part 18*b*, and the third cover part 18*c*.

Each cover part 18 is made, for example, as an integral part out of a uniform material, without a seam or joint. The cover parts 18 consist of electrically insulating material. Therefore, they do not conduct the voltages or currents applied to the electrical conductors 12, 13. Preferably, the cover parts 18 can be made of a plastic and consist of silicone or ethylene propylene diene monomer rubber (EPDM), for example. All cover parts 18 of a cover 10 can be made of the same material. It is also possible to use different materials for each of the cover parts 18.

Figure 2:
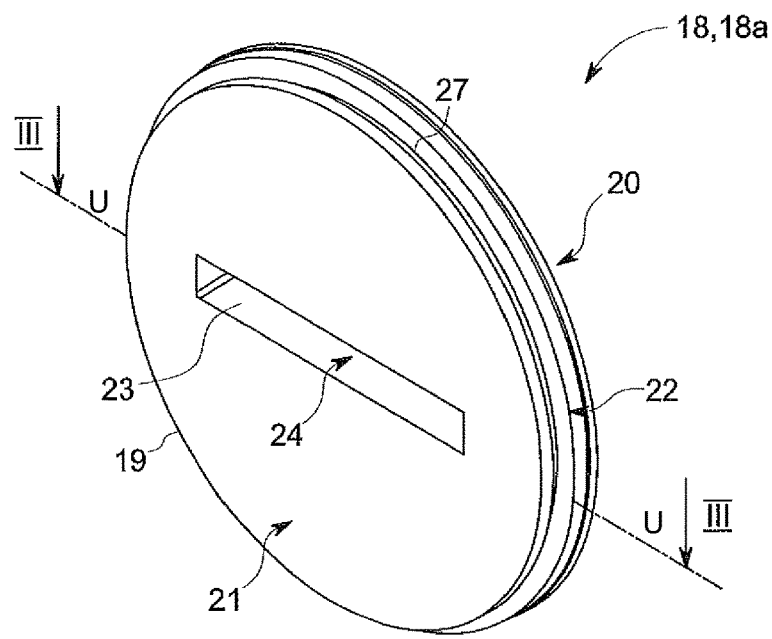
FIG. 2 is a perspective representation of a first cover part of the cover from FIG. 1.
Figure 3:
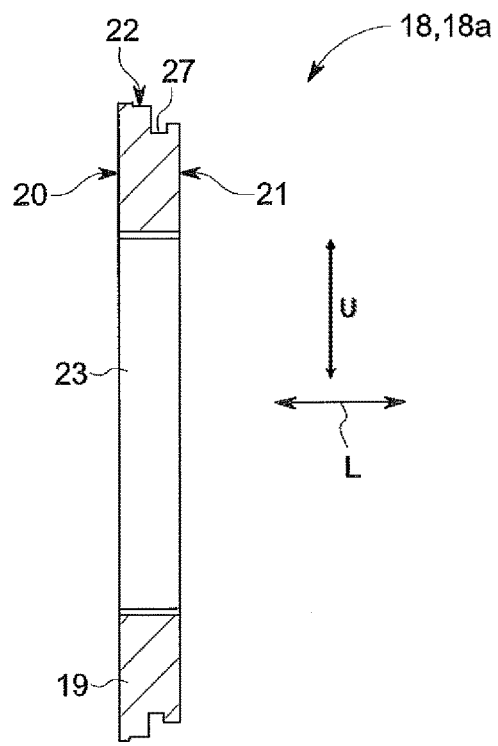
FIG. 3 is a cross section of the first cover part from FIG. 2 cut along the line III-III in FIG. 2.

FIGS. 2 and 3 illustrate a sample embodiment of a first cover part 18*a* in the cover 10. The first cover part 18*a* is made in the form of a plate-shaped body 19. According to the example, the plate-shaped body 19 has an outer side 20 and an inner side 21. The outer side 20 and the inner side 21 can be formed by surfaces oriented parallel to one another. A peripheral side 22 connects the outer side 20 and the inner side 21 with one another. The peripheral side 22 runs in the shape of a closed ring around the longitudinal direction L. In the sample embodiment, the peripheral side 22 has a circular contour. In a modification of this, the peripheral side 22 could also be elliptical or polygonal. It is preferable for the course of the peripheral side 22 to be free of steps or edges when viewed in the peripheral direction U around the longitudinal direction L. Sections of this course of the peripheral side 22 in the peripheral direction U can be curved and/or straight.

The first cover part 18*a* has at least one passage opening 23 completely through it in the longitudinal direction L. The at least one passage opening 23 extends between the outer sides 20 and the inner side 21, and preferably has a constant cross section. The at least one passage opening 23 is designed to hold the at least one first conductor 12. The at least one first conductor 12 can be guided completely through each passage opening 23 of the first cover part 18*a*. Each of the passage openings 23 that is present is bordered by one bordering wall 24. The number of passage openings 23 varies depending on the number of first conductors 12 to be guided through. According to the example, the first cover part 18*a* has a single passage opening for a single first conductor 12 forming the connection 14.

The contour of the passage opening 23 or the bordering wall 24 essentially corresponds to the outside contour of the first conductor 12. In the sample embodiment shown here, the first conductor 12, including its insulating sheath, has a cross section with rectangular contours. Accordingly, the cross-sectional surface of the passage opening 23 in the first cover part 18*a* is also rectangular.

The peripheral side 22 of the first cover part 18*a* has a connection groove 27 made in it. In the sample embodiment illustrated here, the connection groove 27 has a rectangular cross section, however it can also have a ring-shaped cross section with the base of the groove being convex and curving inward, or it can have any other cross section. As can be seen especially in FIG. 3, the diameter of the first cover part 18*a* or the peripheral side 22 between the connection groove 27 and the outer side 20 is greater than that between the connection groove 27 and the inner side 21.

Figure 4:
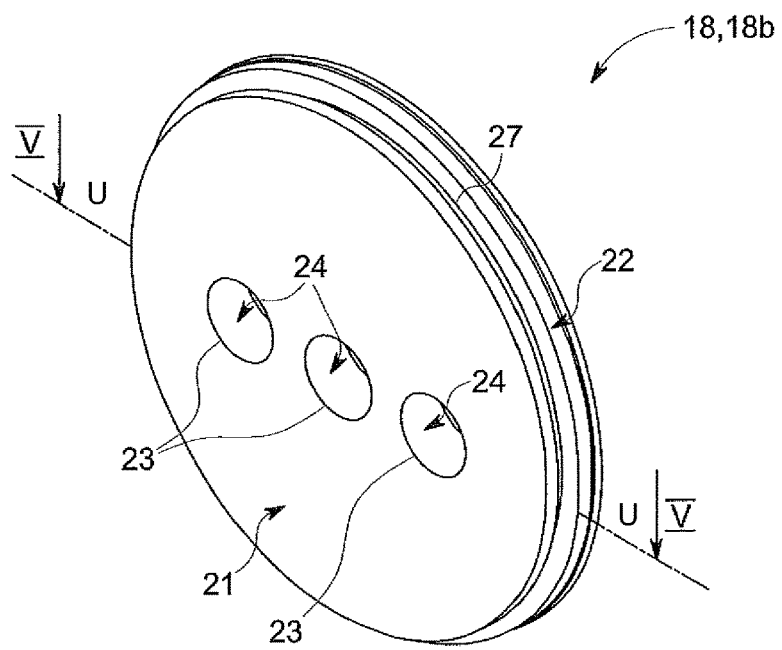
FIG. 4 is a perspective representation of a second cover part of the cover from FIG. 1.
Figure 5:
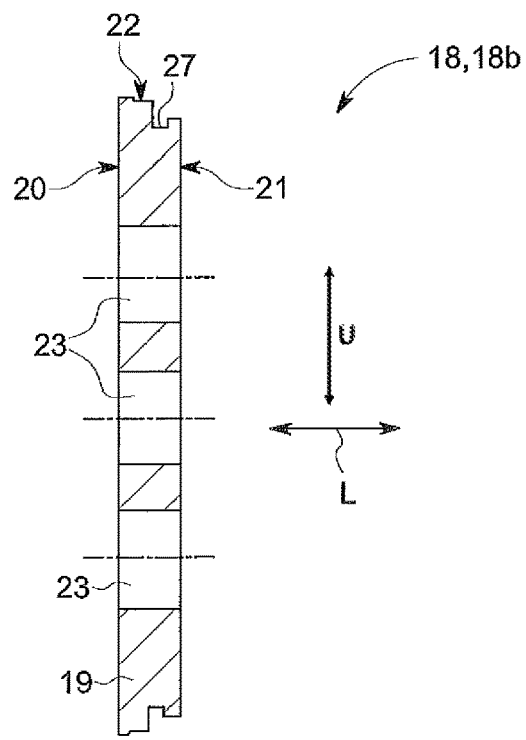
FIG. 5 is a cross section of the second cover part from FIG. 4 cut along the line V-V in FIG. 4.

FIGS. 4 and 5 illustrate a sample embodiment of the second cover part 18*b* of the cover 10. The second cover part 18*b* essentially corresponds to the first cover part 18*a* according to FIGS. 2 and 3. To the extent that it does correspond, it is possible to refer to the above description. The second cover part 18*b* differs from the first cover part 18*a* in the number and the shape of the passage openings 23. According to the example, the second cover part 18*b* has three passage openings 23 corresponding to the three second conductors 13. The passage openings 23 have a circular shape adapted to the cross sectional contour of the respective second conductor 13. Thus, here the bordering wall 24 of each passage opening 23 has the shape of the surface of a cylindrical jacket.

In general, the passage openings 23 and consequently the bordering walls 24 can have any shape that corresponds to that of the respective conductors 12, 13 that are guided through them. A cover part 18*a*, 18*b* can have one or more passage openings 23 in it. It is also possible for multiple passage openings 23 in a cover part 18*a*, 18*b* to have different contours.

Figure 6:
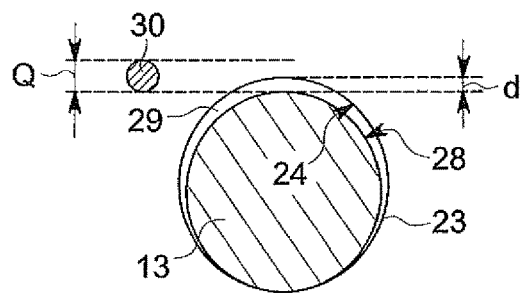
FIG. 6 is a schematic diagram of a remaining gap opening between at least one conductor and a passage opening.

The respective passage opening 23 is adapted to the electrical conductor 12 or 13 that is guided through in such a way that either no gap opening 29 remains between the bordering wall 24 and an outside surface 28 of the respective electrical conductor 12 or 13 that is guided through, or that the remaining gap opening 29 has a maximum dimension d, measured at the point on the periphery being viewed at right angles to the bordering wall 24, is less than or equal to a specified cross sectional profile 30. The specified cross sectional profile 30 is, for example, the cross sectional profile of an ignition wire according to a standardized safety test. The specified cross sectional profile can be circular. The situation is illustrated in a strongly schematized manner in FIG. 6. The dimension—according to the example the diameter Q of the specified cross sectional profile 30—is, as illustrated, greater than the maximum dimension d of the gap opening 29. This ensures that no electrically conductive object that has at least a cross-sectional surface such as the specified cross sectional profile 30 can get through the gap opening 29 into the inner area of the cover 10 and cause an arc outside the area protected by the cover (longitudinal section 11). FIG. 6 shows the relationships on the basis of a circular passage opening 23, such as is present in the second cover part 18b according to the example. The same principle also applies for the rectangular passage opening 23 in the first cover part 18a or other forms of passage openings 23.

As is illustrated in FIG. 1, the first cover part 18a and the second cover part 18b have a separation in the longitudinal direction L and, in the area between them, border the longitudinal section 11, which can be completely enclosed by the cover 10 and thereby protected. In the sample embodiment, the third cover part 18c has the shape of a tube, in particular a tube with a corrugated or collapsible tube wall 33. According to the example, the tube wall 33 is folded harmonica like. Therefore, the third cover part 18c can also be referred to as an expansion bellows. The tube wall 33 is completely closed in the peripheral direction U around the longitudinal direction L. Each longitudinal end 34, 35 of the tube wall 33, and consequently the third cover part 18c, forms an opening, which is circular in the sample embodiment.

Figure 7:
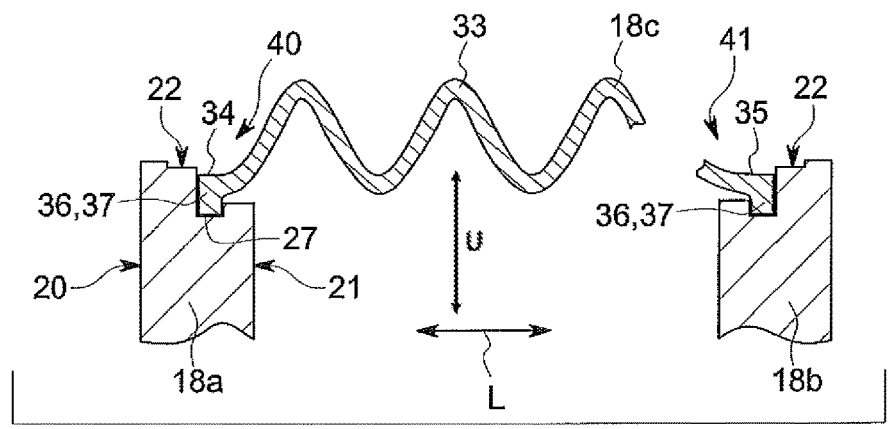
FIG. 7 is a schematic cutaway partial representation of the cover parts of the cover from FIG. 1.

At each longitudinal end 34, 35, the third cover part 18c additionally has a connection projection 36, which can be closed in the shape of a ring in the peripheral direction U around the longitudinal axis L. The connection projection 36 is designed to be inserted into the connection groove 27 on the first cover part 18a or on the second cover part 18b, to create a positive-fit and, according to the example, additionally force-fit connection that can be detached in a nondestructive manner and reconnected. The connection that is made is schematically illustrated in FIG. 7. In this figure, the connection projection 36 is formed by an annular ring 37 that is an integral part of the tube wall 33, and consequently of the third cover part 18c.

At least one of the cover parts 18 is elastically deformable. In the sample embodiment described here, the first cover part 18a and the second cover part 18b are substantially stiffer or less elastic than the third cover part 18c. The first cover part 18a and the second cover part 18b can be essentially rigid given the forces occurring here. The third cover part 18c is designed like an elastic tube or expansion bellows, and can be folded or deformed in the longitudinal direction L and be elastically expanded out of its initial state at a right angle to or radial to the longitudinal direction L.

In the sample embodiment, a nondestructively detachable and reconnectable force-fit and positive-fit connection is made between the third cover part 18c and the first cover part 18a at a first connection location 40. At a second connection location 41, a nondestructively detachable and reconnectable force-fit and positive-fit connection is made between the third cover part 18c and the second cover part 18b. When the connection is made, one connection projection 36 at each longitudinal end 34 or 35 engages into the respective associated connection groove 37 of the first cover part 18a or of the second cover part 18b, as is schematically shown in FIG. 7. In this state, the respective longitudinal end 34 or 35 of the third cover part 18c is expanded radial to the longitudinal direction L out of its initial state and therefore presses against the first cover part 18a or the second cover part 18b and, according to the example, against the base of the groove of the respective connection groove 37.

At the respective connection location 40, 41, the two cover parts 18c and 18a or 18c and 18b are pressed against one another under a radial pretensioning force produced by elastic deformation of at least one of the two cover parts and, according to the example, the third cover part 18c, at the connection location 40, 41. The contact pressure between the two cover parts 18c and 18a or 18c and 18b at the connection location 40, 41 acts in the peripheral direction U at every point on the periphery, and is preferably equally large at every point on the periphery.

To detach the connection at the first connection location 40 or the second connection location 41, the respective longitudinal end 34 of the third cover part 18c can be expanded and the connection projection 36 removed from the connection groove 27. The third cover part 18c, which is deformable or collapsible in the longitudinal direction L, can then be pushed away from the relevant cover part 18a or 18b far enough that the longitudinal section 11 is at least partly accessible and the electrical connection between the at least one first conductor 12 and the at least one second conductor 13 can be undone, for example.

The cover 10 according to the sample embodiment of FIGS. 1 through 7 is used as follows to cover or insulate the longitudinal section 11:

First, the first cover part 18a is slipped onto the free end of the at least one first conductor 12. Analogous to this, the second cover part 18b is slipped onto the free end of each of the at least one second conductor 13. The third cover part 18c can also be slipped over the free end either of the at least one first conductor 12 or of the at least one second conductor 13, so that it encloses the relevant conductor 12 or 13 in the peripheral direction U around the longitudinal direction L. Alternatively, it is also possible to connect the third cover part 18c either with the first cover part 18a or with the second cover part 18b at the beginning, and simultaneously also arrange the third cover part 18c around the free end of the relevant conductor 12 or 13 when the relevant first or second cover part 18a or 18b is slipped onto the respective at least one conductor 12 or 13.

After all three cover parts 18a, 18b, 18c have been positioned, the electrical connection between the at least one first conductor 12 and the at least one second conductor 13 is made in the area of the longitudinal section 11, for example by an electrically conductive threaded connection. Following that, the third cover part 18c is detachably connected, as illustrated in FIG. 1, at both connection locations 40, 41, or at the still remaining connection location 40 or 41, with the respective associated cover part 18a or 18b.

The connection between cover parts 18 of the cover 10, which is detachable at at least one connection location, makes the electrical connection between the conductors 12, 13 accessible and simple to access for maintenance or repair work. Moreover, arcing is avoided when the cover is closed, that is when the connection is made. Therefore, adjacent connections 14 of a transformer or other electrically conductive components or circuit elements can be arranged relatively close to the longitudinal section 11 of the at least one conductor 12 or 13, this longitudinal section 11 being protected by the cover 10, which substantially reduces the size of an electrical system.

Figure 8:
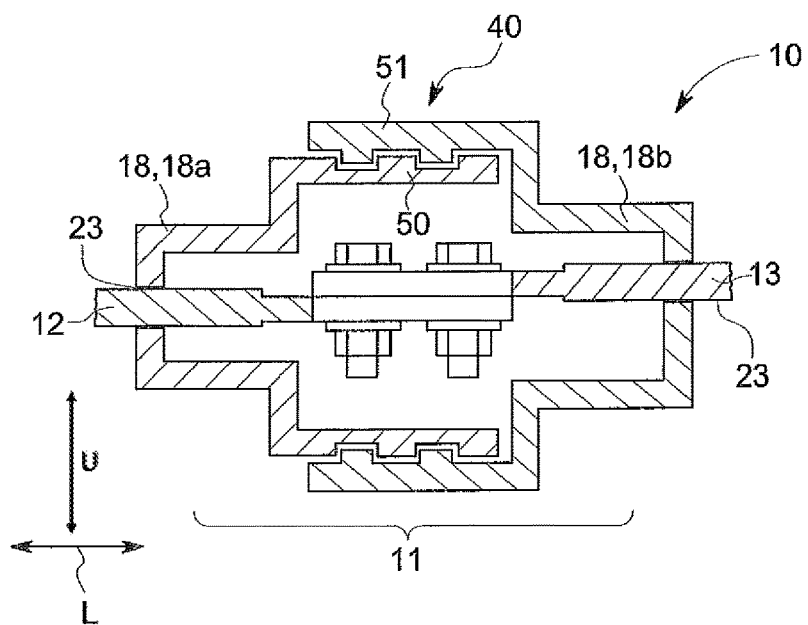
FIG. 8 is a schematic cross sectional representation of a modified sample embodiment of a cover.

FIG. 8 illustrates another sample embodiment of the cover 10. The cover 10 according to FIG. 8 consists only of the first cover part 18a and the second cover part 18b. These are detachably connected with one another in a force-fit and positive-fit manner at a single connection location, which is designated as the first connection location 40. To accomplish this, the two cover parts 18a and 18b each have a hollow cylindrical section, the one hollow cylindrical section of the first cover part 18a forming an inner hollow cylindrical section 50, and the hollow cylindrical section of the second cover part 18b forming an outer hollow cylindrical section 51. The two hollow cylindrical sections 50, 51 overlap in the longitudinal direction L at the connection location 40. At this point, their facing sides lie against one another in a force-fit and/or positive-fit manner, which closes the longitudinal section 11 off from the environment, so that no arc can get out from inside the cover 10.

As is schematically illustrated in FIG. 8, the sides facing one another can have at least one connection projection 37 or at least one connection groove 27 on them, so that the gap between the two hollow cylindrical sections 50, 51 is in the form of a labyrinth.

To undo the connection at the connection location 40, at least one of the two cover parts 18a or 18b is deformed at right angles to or at an angle to the longitudinal direction L, so that the at least one connection projection 37 and the respective associated at least one connection groove 27 of the two hollow cylindrical sections 50, 51 is disengaged and the two hollow cylindrical sections 50, 51 can be pushed relative to one another in the longitudinal direction L. If this is done, the longitudinal section 11 that is enclosed when the connection is made—according to the example, the electrical connection between the at least one first conductor 12 and the at least one second conductor 13—becomes accessible.

It goes without saying that in all sample embodiments it would also be possible for only a force-fit or positive-fit connection to be created at a respective connection location 40, 41, unlike the case of the preferred sample embodiments. It is preferable for the connection to be both force-fit and/or positive-fit.

In the sample embodiment according to FIGS. 1 through 7 that is described here, at both the first connection location 40 and also in the second connection location 41, a detachable and reconnectable connection is provided between the third cover part 18c and the relevant first cover part 18a or the second cover part 18b. At a connection location 40 or 41 it would also be possible to provide a detachable connection that is not non-destructive, for example a materially bonded connection. It is sufficient for the cover 10 to provide a single connection location 40 or 41 with a nondestructively detachable and reconnectable connection.

The invention relates to a cover 10 to enclose a longitudinal section 11 of at least one electrical conductor 12, 13 and prevent the formation of an arc or a flashover. The cover 10 has at least two cover parts 18 made of an electrically insulating material. A first cover part 18a and a second cover part 18b each have at least one passage opening 23. Each passage opening 23 has an electrical conductor 12, 13 guided through it, so that no gap opening 29, or only a small gap opening 29 remains between the outside surface 28 of the conductor 12, 13 and a bordering wall 24 of the passage opening 23. Moreover, the cover 10 has at least one connection location 40, 41. At this connection location, two of the cover parts that are present 18a, 18c or 18a, 18c or 18a, 18b respectively, lie against one another in a force-fit and/or positive-fit manner and form a nondestructively detachable connection. This ensures accessibility to the protected longitudinal section 11.

The invention claimed is:

1. A cover for at least one electrical conductor,
   with at least two cover parts made of an electrically insulating material,
   wherein a first cover part and a second cover part have at least one passage opening, each to guide through one of the electrical conductors that are present,
   wherein no location on the periphery has a gap opening between a bordering wall of the respective passage opening and an outside surface of the respective electrical conductor that is guided through whose dimension is greater than a specified cross sectional profile,
   wherein the cover has at least one connection location at which two of the cover parts that are present are detachably connected with one another in a force-fit and/or positive-fit manner without using separate connection elements,
   and wherein the cover completely surrounds a section of the at least one conductor when the connection is made between the cover parts; and
   wherein the cover has a third cover part having a tubular shape, the third cover part being connected at a first connection location with the first cover part and at a second connection location with the second cover part, the third cover part being elastically deformable and the first cover part and the second cover part are rigid.

2. The cover according to claim 1,
   wherein that at least one of the cover parts that are present is elastically deformable.

3. The cover according to claim 1,
   wherein that at every connection location that is present two of the cover parts are directly connected with one another.

4. The cover according to claim 2,
   wherein that the one of the two cover parts has a ring-shaped connection groove and the respective other cover part has a ring-shaped connection projection that engages into the connection groove when the connection is made between the two cover parts.

5. The cover according to claim 2,
   wherein that at least one of the two cover parts connected with one another at a connection location is elastically deformable to make and undo the connection.

6. The cover according to claim 2,
   wherein that when a connection is made between the two cover parts at least one of the two cover parts is elastically deformed, causing it to lie against the respective other cover part with a pretensioning force.

7. The cover according to claim 1,
   wherein the first cover part and the second cover part are moveable relative to one another along the at least one conductor, at least when the connection is undone at the at least one connection location.

8. The cover according to claim 1,
   wherein that only the first cover part and the second cover part are present and are connected with one another at a connection location.

9. The cover according to claim 1,
   wherein that the first cover part and the second cover part are arranged at a distance from one another.

10. The cover according to claim 1,
    wherein that the third cover part has, on at least one of its two opposite ends, each of which is associated with one of the two connection locations, an annular ring that engages into a connection groove on the first cover part or the second cover part when the connection is made.

11. The cover according to claim 1,
    wherein that at least one or all cover parts is each made as an integral part out of a uniform material.

12. A process to cover a section of at least one electrical conductor using a cover according to claim 1, with the following steps:
    guiding at least one first conductor through a respective passage opening of the first cover part;

guiding at least one second conductor through a respective passage opening of the second cover part;
creating an electrical connection between the at least one first conductor and the at least one second conductor;
creating a detachable force-fit and/or positive-fit connection of the cover parts that are present at at least one connection location, without using separate connection elements.

\* \* \* \* \*